United States Patent [19]

Bellwood

[11] Patent Number: 4,903,413
[45] Date of Patent: Feb. 27, 1990

[54] SURFACE PROFILE MEASUREMENT OF WORKPIECES

[75] Inventor: Philip R. Bellwood, Market Harborough, United Kingdom

[73] Assignee: Rank Taylor Hobson Limited, United Kingdom

[21] Appl. No.: 11,102

[22] Filed: Feb. 5, 1987

[30] Foreign Application Priority Data

Feb. 7, 1986 [GB] United Kingdom ............... 8603060

[51] Int. Cl.$^4$ ............................................. G01B 5/20
[52] U.S. Cl. ................................. 33/551; 33/178 D; 33/178 E
[58] Field of Search .................................. 33/551-554, 33/178 D, 178 E, 178 R

[56] References Cited

U.S. PATENT DOCUMENTS

| 3,056,209 | 10/1962 | Oliver | 33/554 X |
| 3,274,693 | 9/1966 | Witzke | 33/178 D |
| 3,942,253 | 3/1976 | Gebel et al. | 33/551 X |

FOREIGN PATENT DOCUMENTS

| 1944605 | 5/1971 | Fed. Rep. of Germany | 33/550 |
| 2912640 | 9/1980 | Fed. Rep. of Germany | 33/178 E |

*Primary Examiner*—Harry N. Haroian
*Attorney, Agent, or Firm*—Lerner, David, Littenberg, Krumholz & Mentlik

[57] ABSTRACT

In order to measure the surface profile of a workpiece, a yoke having two fixed feet is held in contact with the surface as the workpiece is rotated. A dynamic probe is mounted on the yoke by means of a transducer which outputs a signal dependent upon the position of the dynamic probe relative to a transducer datum. The fixed feet and the foot of the dynamic probe have a similar shape and size so that they detect irregularities in the workpiece surface with equal sensitivity. Fourier analysis of the signal caused by movement of the dynamic probe directly by the workpiece and also by movement of the yoke enables the profile of the workpiece to be determined. In order to improve the frequency response of the transducer output over the range of harmonics considered, the angles between the dynamic probe and the fixed probes are unequal. The apparatus does not require a precision spindle type machine to rotate the workpiece and is therefore particularly suitable for in situ measurement of workpiece profiles.

14 Claims, 3 Drawing Sheets

SURFACE PROFILE MEASUREMENT OF WORKPIECES

FIELD OF THE INVENTION

This invention relates to an apparatus and method of measuring a surface profile of a workpiece.

In particular, a first aspect of the present invention is concerned with an apparatus for measuring a surface profile of a workpiece, comprising a probe assembly having a pair of feet and a detector means, the probe assembly being movable relative to the workpiece such that the feet engage the workpiece surface at first and second locations spaced in the direction of relative movement, the detector means being operable to provide a signal dependent upon the distance relative to the probe assembly of a third location on the workpiece surface spaced from the feet locations in the direction of relative movement.

BACKGROUND TO THE INVENTION

A V-block measuring apparatus is known in which a workpiece is rotated relative to a V-block having flat sides contacting an external surface of the workpiece at the first and second locations, for example as shown in U.S. patent specification 3274693. This specification also shows in FIGS. 9 and 10 thereof, an apparatus acting in the same way as the V-block apparatus, but for measuring internal surfaces, and having rounded feet for engaging the workpiece at the first and second surfaces.

A disadvantage of the V-block apparatus and of the internally-measuring modification thereto is that the sides of the "V" or the feet follow coarse irregularities in the surface, but not fine irregularities, and therefore the signal from the detector means does not completely represent the surface profile.

SUMMARY OF THE INVENTION

The first aspect of the present invention is characterised in that the feet are adapted to follow variations in the surface profile substantially as closely as the detector means. Alternatively, given a desired sensitivity to surface variations, not only the detector means but also the feet are arranged to produce that sensitivity.

Thus, the apparatus provides a signal which can be processed (as described below) to determine the profile taking into account movement of the probe assembly due to irregularities in the workpiece profile. Indeed, the apparatus may include means responsive to the signal to determine the surface profile of the workpiece, the determining means being operable to take into account variations in the detected distance due to movement of the probe assembly caused by the feet engaging irregularities in the surface profile in addition to variations in the detected distance due to surface irregularities directly in line with the detector means.

Preferably, the feet are adapted to make essentially point contact with the workpiece or line contact with the workpiece along a line transverse to the direction of relative movement. For example, the feet may be "hatchet" or "toroidal" feet, in order to follow the workpiece surface closely.

Fourier analysis may be employed to determine the amplitudes and phases of a plurality of harmonics by which the workpiece profile can be represented. In the case where the detecting means and feet are asymmetrically disposed, it has been found that a flatter amplitude frequency response can be achieved, especially at the ends of the range of harmonics considered. Preferably, the relative spacings of the first and third locations and of the second and third locations are in the ratio of an even number to one, for example 4:1, in order to provide a flatter amplitude frequency response at the middle of the harmonic range.

The apparatus may also include a further detector means for providing a signal dependent upon the distance relative to the probe assembly of a fourth location on the workpiece surface spaced from the first, second and third locations. The signals of the two detector means may be added, and the probe assembly may be arranged so that the relative spacing of the first and fourth locations is equal to the relative spacing of the second and third locations. This then has the effect of eliminating phase distortion of the frequency response. Alternatively, the probe assembly may be arranged so that the relative spacing of the first and fourth locations is not equal to the relative spacing of the second and third locations. This then has the effect of extending the frequency response to interleaving the two component frequency responses across the harmonic range.

The apparatus may include a second such probe assembly spaced from the first mentioned probe assembly and further detector means mounted with respect to the first and second probe assemblies for providing a signal dependent upon the distance to a further location on the workpiece spaced from the planes of detection of the detector means of the first and second probe assemblies. The apparatus can then be used to measure roundness, eccentricity, cylindricity and taper of a generally cylindrical workpiece.

DESCRIPTION OF THE EMBODIMENT

Many present methods of measuring complete profiles of workpieces necessitate removing the workpiece from the workshop to either an instrument for surface measurement of the precision spindle type or a computer controlled coordinate measuring machine. Whilst the apparatus described below can be used with a precision spindle instrument, it may also be used in a machining workshop, without the need for removing the workpiece from the machine, because the apparatus does not rely upon the axis of rotation of the workpiece being accurately set with respect to the measuring apparatus. It is, however, necessary to provide on the machine which rotates the workpiece some means for angular datum detection, such as an optical sensor cooperating with an apertured disc mounted for rotation with the workpiece.

Figure 1:
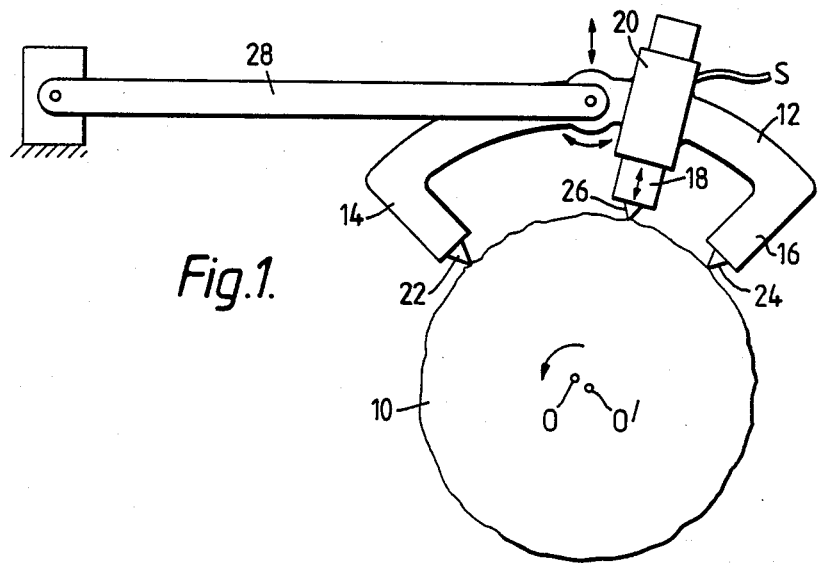
FIG. 1 is a view of a surface profile measuring apparatus.

Referring to FIG. 1, a generally cylindrical workpiece 10 to be measured is mounted for constant speed rotation about an apparatus axis 0, the nominal axis 0' of the workpiece being approximately co-axial with the apparatus axis 0. A probe yoke 12 carries two relatively fixed probes 14, 16 and also one dynamic probe 18 mounted for radial movement in conjunction with a transducer stator 20 which outputs a signal S linearly related to the position of the dynamic probe 18 relative to the yoke 12. Each of the probes 14, 16, 18 has a hatchet or toroidal foot 22, 24, 26 for engaging the workpiece 10. The feet are of similar shape and size. The yoke 12 is pivotally attached to one end of an arm 28, the other end of which is pivotally attached to the apparatus, so that the yoke can move generally vertically as seen in FIG. 1 and also rock about its pivotal connection to the arm 28 to allow the feet 22, 24 of the fixed probes 14, 16 to ride on the surface of the workpiece as it rotates. The dynamic probe is spring-loaded to maintain its foot 26 in contact with the workpiece 10.

The motion of the apparatus shown in FIG. 1 will now be described with reference to FIGS. 2 to 5, in which the positions of the probe feet 22, 24, 26 are designated C, A, B respectively, and a transducer stator datum is denoted D. A yoke centre Y is defined on the line of action BY of the dynamic probe and at a distance $R_o$ from the point of contact of each foot A, C. The feet B, C and B, A are angularly spaced by angles $\alpha$ and $\beta$ about the yoke centre Y.

Figure 2:
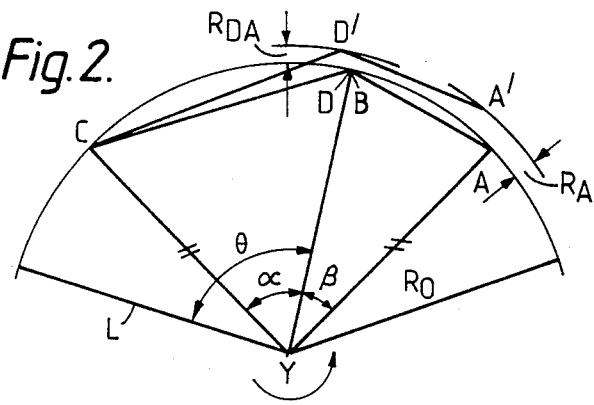
FIGS. 2 to 4 are diagrams to illustrate movements of parts of the apparatus of FIG. 1.

FIG. 2 shows the case where the workpiece causes an increment of radius $R_A$ at foot A, so that it moves to position A' without the radial position of the foot B moving. This movement causes an increment of radius $R_{DA}$ of the transducer datum D from the original yoke centre Y. From the geometry of FIG. 2, it can be determined that:

$$R_{DA} = R_A \sin \alpha / \sin (\alpha + \beta)$$

Since the foot B does not move from the reference surface, a transducer signal $S_A$ due to the movement $R_{DA}$ between the foot B and transducer datum D caused by movement of the foot A is:

$$S_A = -kR_A \sin \alpha / \sin (\alpha + \beta)$$

where k is a transducer constant relating output signal to displacement.

Figure 3:
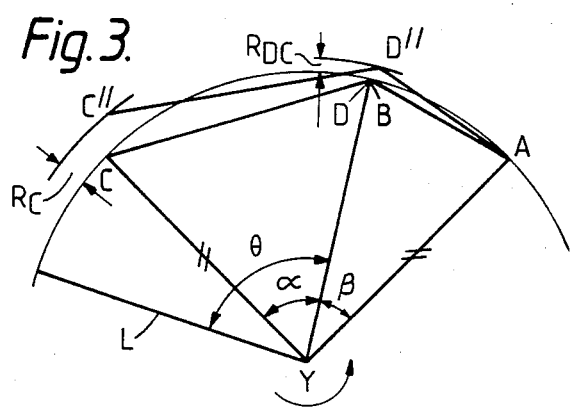

Similarly, referring to FIG. 3, an increment of radius $R_C$ at the foot C causes an increment of radius $R_{DC}$ of the transducer datum from the original yoke centre Y, such that:

$$R_{DC} = R_C \sin \beta / \sin (\alpha + \beta)$$

This produces a transducer signal $S_C$ such that:

$$S_C = -kR_C \sin \beta / \sin (\alpha + \beta)$$

Figure 4:
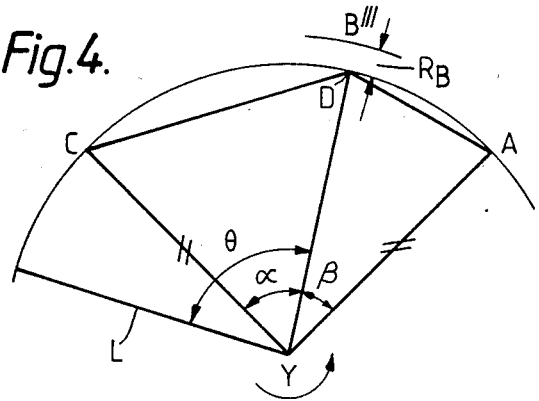

Referring to FIG. 4, an increment of radius $R_B$ at the foot B does not cause any movement of the yoke and transducer stator datum D and thus a signal $S_B$ is produced such that:

$$S_B = kR_B$$

The immediately preceding description describes the case where the workpiece is static and increments of radius are produced at the three feet A, B, C. Consider now that the workpiece is rotated and it will be noted that:

$$R_A(\theta) = R(\theta + \beta)$$

$$R_B(\theta) = R(\theta)$$

$$R_C(\theta) = R(\theta - \alpha)$$

where $\theta$ is the angle of a datum radial line L on the workpiece with respect to the radial line passing through the foot B.

It follows, therefore, that the signals attributable to the movements of the feet A, B, C are $$S_A = -kR(\theta + \beta)\sin\alpha/\sin(\alpha + \beta)$$

$$S_B = kR(\theta)$$

$$S_C = -kR(\theta - \alpha)\sin\beta/\sin(\alpha + \beta)$$

In the following description, the terms a and b are adopted such that:

$$a = \sin\beta/\sin(\alpha + \beta)$$

$$b = \sin\alpha/\sin(\alpha + \beta)$$

The total signal is:

$$S = S_A + S_B + S_C = k\{R(\theta) - bR(\theta + \beta) - aR(\theta - \alpha)\}$$

The radius profile of a section of a workpiece can be expressed as a Fourier series:

$$R(\theta) = \Sigma C_n \cos [n\theta + \nu_n]$$

where n are integers which are the harmonic numbers; $\nu_n$ is the phase of the nth harmonic; and $C_n$ is the amplitude of the nth harmonic. It will be noted, therefore, that:

$$R(\theta + \beta) = C_n \cos[n(\theta + \beta) + \nu_n]$$

$$R(\theta - \alpha) = C_n \cos[n(\theta - \alpha) + \nu_n]$$

Substituting into the equation for the signal S:

$$S = k\Sigma C_n \{\cos [n\theta + \nu_n] - b \cos [n(\theta + \beta) + \nu_n] - a \cos [n(\theta - \alpha) + \nu_n]\}$$

Since the values k, a and b are known, it is possible, using standard Fast Fourier Transform (FFT) techniques and a computer, to obtain the values of $C_n$ and $\nu_n$ over a desired range of harmonics from the variation of the signal S during one rotation of the workpiece at a constant speed. Once these values are known, they can be substituted back into the equation:

$$R(\theta) = \Sigma C_n \cos [n\theta + \nu_n]$$

Thus, the radius profile is determined.

The Fourier series representing the signal S can be written as:

$$S = k\Sigma A_n C_n \cos [(n\theta + \nu_n) + \phi_n]$$

where:

$$A_n^2 = [1 - a\cos(n\alpha) - b\cos(n\beta)]^2 + [a\sin(n\alpha) - b\sin(n\beta)]^2$$

and $$\phi_n = \tan^{-1}\left(\frac{a\sin(n\alpha) - b\sin(n\beta)}{1 - a\cos(n\alpha) - b\cos(n\beta)}\right)$$

$A_n$ represents the amplitude frequency response of the nth harmonic and $\phi_n$ represents the phase shift frequency response.

In the case where $\alpha=\beta$, the amplitude frequency response is $1-(\cos(n\beta)/\cos\beta)$ and has values of zero for $n=1$ and $n=(2\pi/\beta)-1$. The maximum value of the amplitude frequency response occurs for the value $n=\pi/\beta$. A pass-band thus occurs between the values of $n=2$ and $n=(2\pi/\beta)-2$ centred on $n=\pi/\beta$.

Figure 5:
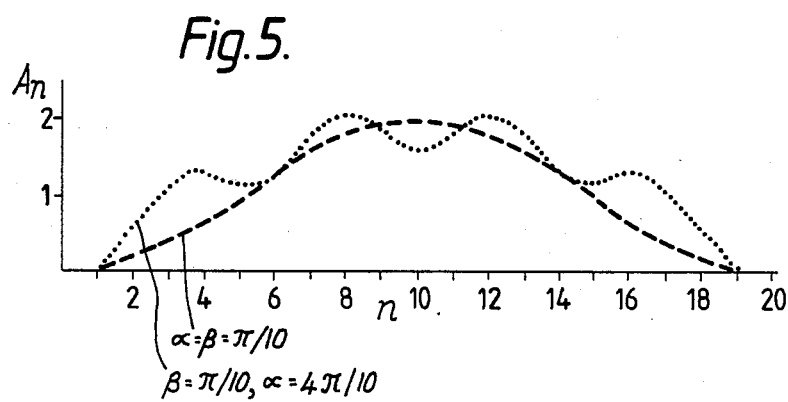
FIG. 5 is an amplitude frequency response graph for the apparatus.

In the case where $\alpha=\beta=\pi/10$ (18°), the amplitude frequency response is as shown by the dashed line in FIG. 5. It will be noted that the amplitude frequency response for $n=2$ and $n=18$ is about one-tenth of that for $n=10$, which is undesirable, since a flatter frequency response would produce less likelihood of error.

By adopting an asymmetric probe arrangement, that is with $\alpha$ and $\beta$ being unequal, it is possible to improve the performance of the apparatus.

Multiplying out the square of the amplitude frequency response:

$$A_n^2 = 1 + a^2 + b^2 - 2a\cos(n\alpha) - 2b\cos(n\beta) + 2ab\cos[n(\alpha+\beta)]$$

For $\alpha>\beta$ and thus $a<b$, this square can be considered to be of the form of a steady curve $1+a^2+b^2-2b\cos(n\beta)$ modified by a ripple component of $-2a\cos(n\alpha)+2ab\cos[n(\alpha+\beta)]$. With increasing $\alpha$, the ripple component effects a rapid increase of response with respect to n in the neighbourhood of the pass-band limits, thus producing a flatter response.

Preferably, the ripple component should detract from the steady component at mid-band ($n_{mid}=\pi/\beta$), so as to improve further the flatness of the response, rather than produce a pronounced peak. By setting $\alpha=2m\pi/n_{mid}$, where m is an integer, the ripple component $-2a\cos(n\alpha)+2ab\cos[n(\alpha+\beta)]$ becomes $-(2a+2ab)$, which is a negative minimum. For the arrangement of FIG. 5, possible values of $\alpha$ to produce this result are $2\pi/10$, $4\pi/10$ and $6\pi/10$. In FIG. 5, the dotted line shows the amplitude frequency response for the values $\beta=\pi/10$ and $\alpha=4\pi/10$ It will be seen that the response has maxima of about 2.1 at $n=8$ and $n=12$, and that the response at $n=2$ and $n=18$ is about 3/10 of the response at $n=8$ or $n=12$.

Figure 6:
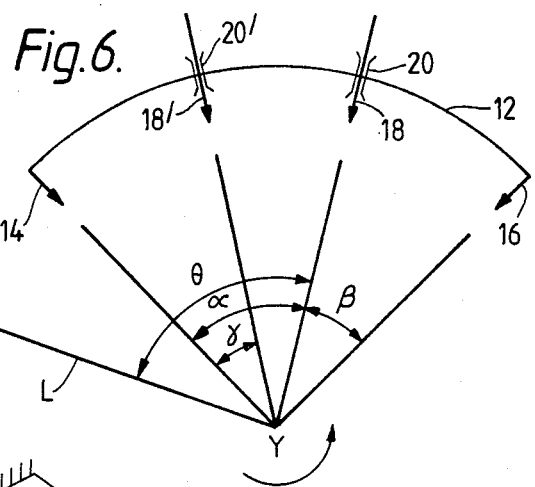
FIG. 6 is a schematic drawing of another apparatus.

In a modification of the arrangement described above, the yoke 12 is fitted with a further transducer 20' and dynamic probe 18', as shown schematically in FIG. 6 of the drawings, set at an angle $\alpha$ from the probe 14. In one arrangement, the angles $\beta$ and $\alpha$ are set equal and the output signals of the transducers 20, 20' are simply summed in the case where the transducers have equal transducer constants k. If the increments of radius of the workpiece profile are considered to be the sum of two components of each harmonic, one being the sine component and the other being the cosine component relative to the direction of symmetry of the yoke 12, then the cosine components add due to even symmetry, but the sine components subtract and cancel due to odd symmetry. Therefore, the resultant frequency response has no phase error. In an alternative arrangement, the angles $\beta$ and $\alpha$ are set unequal. Thus, the ripple components of the frequency responses of the two probes 18, 18' will be interleaved and thus yield an extended frequency response.

Figure 7:
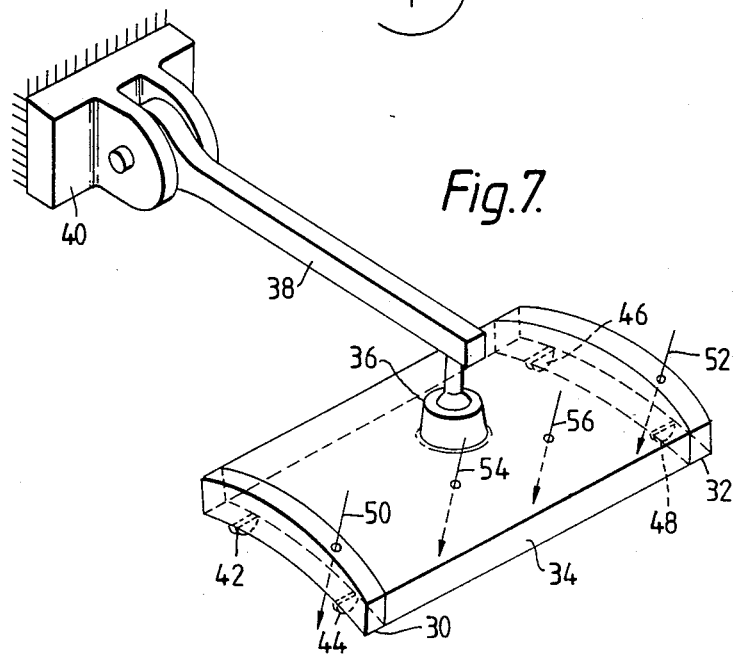
FIG. 7 is an exploded perspective view of a further apparatus.

Whilst the embodiments described above are suitable for measuring roundness of a generally cylindrical workpiece in one radial plane, reference is now made to FIG. 7 which illustrates a modified apparatus for measuring roundness, eccentricity, cylindricity and taper of a generally cylindrical workpiece.

The apparatus includes a pair of yoke assemblies 30, 32 generally similar to that shown in FIG. 1, but connected by a rigid spacer member 34. The spacer member is connected by a ball and cone bearing 36 to one end of an arm 38 enabling pivoting about all axes, and the other end of the arm is pivotally connected to a support member 40 for axial pivoting. Each yoke assembly 30, 32 has a pair of fixed feet 42, 44, 46, 48 and carries a respective transducer 50, 52. It will be appreciated that each yoke assembly 30, 32 acts independently in a similar manner to the arrangement of FIG. 1, and thus $R_{50}(\theta)$ and $R_{52}(\theta)$ in the radial planes of the transducers 50, 52 can be determined. However, further transducers 54, 56 are also mounted on the spacer member in different radial planes. Therefore, having determined $R_{50}(\theta)$ and $R_{52}(\theta)$, from $R_{50}(\theta)$ and $R_{52}(\theta)$ and the signals produced by the transducers 54, 56 it is possible also to determine $R_{54}(\theta)$ and $R_{56}(\theta)$ in the radial planes of each of the further transducers 54, 56 and thus deterine the roundness, eccentricity, cylindricity and taper of the workpiece.

It will be appreciated that further modifications and developments may be made to the apparatus described above. For example, the probe foot 18 and transducer 20 could be replaced by an optical or ultrasonic measuring device. The apparatus is not limited to measuring generally round section workpieces and may be modified for measuring, for example, linearity and flatness.

I claim:

1. An apparatus for measuring a surface profile of a workpiece having a generally circular section, comprising a probe assembly, means for rotating the workpiece relative to the probe assembly, the probe assembly comprising a yoke, a pair of feet mounted on the yoke for engagement with the workpiece surface at the section to be measured at first and second locations spaced in the direction of relative movement so that the feet and yoke follow variations in the surface profile upon such movement, and detector means which is mounted on the yoke operable to provide a signal dependent upon the distance relative to the probe assembly of a third location on the work piece surface spaced from the feet locations in the direction of relative movement, the signal varying in accordance with the relative rotational position of the workpiece and the probe assembly, the feet being adapted to follow variations in the surface profile substantially as closely as the detector means, the apparatus further comprising signal processing means responsive to the signal from the detector means for determining the surface profile of the workpiece, said signal processing means being operable to take into account variations in the detected distance due to movement of the yoke caused by the feet engaging irregularities in the surface profile in addition to variations in the detected distance due to surface irregularities directly detected by the detector means.

2. An apparatus as claimed in claim 1, characterized in that the feet are adapted to make essentially point contact with the workpiece.

3. An apparatus as claimed in claim 1, characterized in that the feet are each fixed rigidly to the yoke.

4. An apparatus as claimed in claim 1, characterized in that the relative spacings of the first and second locations and the second and third locations are not equal.

5. An apparatus as claimed in claim 4, characterised in that the relative spacings are in the ratio of an even number to one.

6. An apparatus as claimed in claim 5, characterised in that the relative spacings are in the ratio of 4:1.

7. An apparatus as claimed in claim 1, characterized by a further detector means for providing a signal dependent upon the distance relative to the probe assembly of a fourth location on the workpiece surface spaced from the first, second and third locations in the direction of relative movement of the workpiece and the probe assembly.

8. An apparatus as claimed in claim 7, characterized in that the relative spacings of the second and third locations and the first and third locations are not equal and in that the relative spacings of the first and fourth locations is equal to the relative spacing of the second and third locations.

9. An apparatus as claimed in claim 7, characterized in that the relative spacing of the first and fourth locations is not equal to the relative spacing of the second and third locations.

10. An apparatus as claimed in claim 7, further comprising means for adding the signals of the two detector means.

11. An apparatus as claimed in claim 1, and including a second such probe assembly spaced from and connected to the first mentioned probe assembly and further detector means mounted with respect to the first and second probe assemblies for providing a signal dependent upon the distance to a further location on the workpiece spaced from the planes of detection of the detector means of the first and second probe assemblies.

12. An apparatus as claimed in claim 1, characterized in that the feet are adapted to make essentially line contact with the workpiece along a line transverse to the direction of relative movement.

13. Apparatus as claimed in claim 1 wherein said signal processing means includes means for deriving from said detector signal amplitudes and phases associated with each harmonic of a Fourier series representing the surface profile of the workpiece as a plurality of harmonics.

14. Apparatus as claimed in claim 13, wherein said means for deriving said amplitudes and phases of said Fourier series representing the surface profile includes means for determining amplitudes and phases of another Fourier series representing said detector signal as a plurality of harmonics, each harmonic in said detector signal Fourier series having a first amplitude and phase attributable to movement of the third location relative to the probe assembly, in combination with second and third amplitudes and phases attributable to the movement of the probe assembly at the first location and the second location, respectively, the second and third amplitudes having predetermined ratios with respect to the first amplitude, and the second and third phases having predetermined offsets from the first phase.

* * * * *